(12) United States Patent
McKillip, Jr.

(10) Patent No.: US 6,220,550 B1
(45) Date of Patent: Apr. 24, 2001

(54) ACTUATING DEVICE WITH MULTIPLE STABLE POSITIONS

(75) Inventor: Robert M. McKillip, Jr., Hopewell, NJ (US)

(73) Assignee: Continuum Dynamics, Inc., Ewing, NJ (US)

(*) Notice: Subject to any disclaimer, the term of this patent is extended or adjusted under 35 U.S.C. 154(b) by 0 days.

(21) Appl. No.: 09/282,709

(22) Filed: Mar. 31, 1999

Related U.S. Application Data

(60) Provisional application No. 60/080,154, filed on Mar. 31, 1998.

(51) Int. Cl.[7] .................................................. B64C 13/24
(52) U.S. Cl. .................. 244/215; 244/75 R; 244/213; 148/402; 114/332; 114/144 R
(58) Field of Search .................................... 244/215, 214, 244/212, 211, 75 R, 213; 148/402; 114/330, 332, 144 R

(56) References Cited

U.S. PATENT DOCUMENTS

| | | | |
|---|---|---|---|
| 2,624,531 | 1/1953 | Stalker | 244/17.13 |
| 2,642,143 | 6/1953 | Miller | 170/160.25 |
| 2,716,460 | 8/1955 | Young | 170/160.1 |
| 3,042,371 | 7/1962 | Fanti | 253/78 |
| 3,930,626 | 1/1976 | Croswell, Jr. | 244/44 |
| 4,953,098 | 8/1990 | Fischer, Jr. et al. | 364/508 |
| 5,114,104 | 5/1992 | Cincotta et al. | 244/219 |
| 5,150,864 | 9/1992 | Roglin et al. | 244/219 |
| 5,224,826 | 7/1993 | Hall et al. | 416/4 |
| 5,242,130 | 9/1993 | Mouille et al. | 244/17.13 |
| 5,366,176 | 11/1994 | Loewy et al. | 244/75 R |
| 5,529,458 | 6/1996 | Humpherson | 416/20 R |
| 5,588,800 | 12/1996 | Charles et al. | 416/24 |
| 5,626,312 | 5/1997 | Head | 244/75 R |
| 5,662,294 | 9/1997 | Maclean et al. | 244/219 |
| 5,752,672 | 5/1998 | McKillip, Jr. | 244/75 R |
| 5,839,698 | * 11/1998 | Moppert | 244/215 |
| 5,887,828 | * 3/1999 | Appa | 244/215 |
| 5,895,015 | * 4/1999 | Saiz | 244/90 R |

OTHER PUBLICATIONS

Chopra, I., "Development of a Smart Rotor," 19th European Rotorcraft Forum, Associazione Industrie Aerospaziali, Cernobbio (Como), Italy, Sep. 14, 1993, pp. N6–0 to N6–18.

(List continued on next page.)

Primary Examiner—J. Woodrow Eldred
(74) Attorney, Agent, or Firm—David M. Quinlan, P.C.

(57) ABSTRACT

A mechanical actuating device for moving an aerodynamic or hydrodynamic surface includes at least one flexure member confined in an elastically deformed condition. The flexure member is movable against the force generated by its elastic deformation to move the device into one of a plurality of stable positions, in which the device, and therefore the aerodynamic or hydrodynamic surface, are held by the force generated by elastic deformation of the flexure member. Since the flexure member is always elastically deformed, it "snaps" between discrete, stable positions and is held firmly in each. In another embodiment more flexure members can be used to provide additional stable positions. In one application, the actuating device is used as a trailing edge tab for a helicopter or tiltrotor blade to reduce 1/rev vibrations. The device can be actuated manually or electrically using shape-memory alloy wires to snap the flexure members into their various stable positions.

16 Claims, 4 Drawing Sheets

OTHER PUBLICATIONS

Duffy, R.E., et al., "A Theoretical and Experimental Study of the Snap–Through Airfoil and its Potential as a Higher Harmonic Control Device" (AA–88–0668), AIAA 26th Aerospace Sciences Meeting, Ren, NV, Jan. 11–14, 1988, pp. 1–11.

Giurgiutiu, V., et al., "Incrementally Adjustable Rotor–Blade Tracking Tab Using SMA Composites" (AIAA–97–1387), American Inst. of Aeronautics ans Astronautics, 1997, pp. 1456–1466.

Hodgson, D., "Using Shape Memory for Proportional Control," *Engineering Aspects of Shape Memory Alloys*, Butterworth–Heinemann (1990), pp. 362–366.

Straub, F.K., et al., "Application of Smart Materials to Helicopter Rotor Active Control,"SPIE vol. 3044, Symposium on Smart Structures & Materials, San Diego, CA, Mar. 3–6, 1997, pp. 99–113.

Yang, Y–J, et al., "Dynamics of a Bistable Snapping Microactuator," SPIE vol.2443, Symposium on Smart Structures & Materials, San Diego, CA, 1995, pp. 754–762.

* cited by examiner

ACTUATING DEVICE WITH MULTIPLE STABLE POSITIONS

CROSS-REFERENCE TO RELATED APPLICATIONS

This application claims the benefit of U.S. provisional application No. 60/080,154, filed Mar. 31, 1998.

STATEMENT REGARDING GOVERNMENT RIGHTS

This invention was made with Government support under contract number DAAJ02-96-C-0032 awarded by the U.S. Army. The Government has certain rights in the invention.

BACKGROUND OF THE INVENTION

1. Field of the Invention

The present invention relates to an actuating device that is capable of stably occupying at least two discrete positions, and more particularly, to such a device used to move an aerodynamic or hydrodynamic surface.

2. Description of Related Art

Helicopters and tiltrotors are susceptible to a form of disturbance known as "1/rev vibration," so-called because it occurs at a frequency that matches the angular velocity of the helicopter or tiltrotor blades. There are numerous sources of 1/rev vibration, but a major source is non-uniformity in the aerodynamic contour, mass and stiffness distributions of individual blades. Blades with different aerodynamic, inertial and structural properties will generate different forces and moments, thus producing a once-per-revolution forcing of the helicopter or tiltrotor aircraft. These same forces will cause the blades to travel in different paths as they rotate. Thus, 1/rev vibration can be reduced if the blades are modified to all fly in the same path.

Theoretically, this problem should be solvable by closely controlling manufacturing tolerances of the blades. However, cost and practical constraints prevent perfectly matching individual blades in all aerodynamic, structural and inertial properties. Moreover, any repairs occasioned by, for example, damage from handling or in combat, would inevitably change a blade's mass and stiffness distributions.

A preferred manner of controlling 1/rev vibration mounts an individually adjustable tab on the trailing edge of the helicopter or tiltrotor blade. The aerodynamic properties of the blade are controlled by making preflight settings of the blade root pitch angles and trailing edge tabs on the blades. The positions of such tabs are adjusted to change the lift of each rotor blade so that all of the blades "track" (follow the same path in space) as they rotate. The tabs are typically made of plastically deformable metal. To adjust tracking, each individual blade's track is determined while the rotor is rotating. The rotor is then stopped and ground personnel change the tab position. The process is repeated until the blades track sufficiently well to reduce 1/rev vibrations to an acceptable level.

This approach has numerous drawbacks. For one thing, it requires specialized tooling to bend the tabs into their desired positions. It also requires highly skilled and specially trained personnel, and it is only through a great deal of experience with a particular aircraft that maximum efficiency is achieved in reducing 1/rev vibrations. Another drawback for some applications is that a metal tab reflects electromagnetic waves and therefore is incompatible with "stealth" requirements. If a non-metallic composite material is used for the tab, it must be temporarily softened by heating to allow repositioning, which introduces additional steps into the adjustment process.

There have been attempts at providing control surfaces capable of on-blade adjustment. These attempts use active piezoelectric, magnetostrictive or shape-memory alloy materials that can augment or replace mechanical rotor controls by using electrically actuated systems. U.S. Pat. Nos. 5,114,104, 5,150,864, 5,224,826, 5,366,176 and 5,662,294 disclose examples of those kinds of systems. Systems like the ones disclosed in these patents introduce a variety of complexities associated with the precise control required to maintain the desired control surface position. More significant problems include the requirement of some form of localized sensing of the control surface position and the need for constant application of electrical power to maintain the control surface in the desired position.

My U.S. Pat. No. 5,752,672 addresses problems in prior art approaches using shape-memory alloy actuators to change the position of control surfaces on rotating machinery such as a helicopter rotor or other inaccessible devices. In one embodiment of the invention described in detail, a helicopter rotor tab is plastically deformed by antagonistic shape-memory alloy actuating members. That invention eliminated the necessity of maintaining power to the actuating shape-memory alloy members.

However, it requires multiple actuating wires along the tab for a typical helicopter or tiltrotor tab extending for 15% of the blade span and requires a tab made of a plastically deformable material such as aluminum. As a result this system is incompatible with stealthy operation. It would be possible to use a composite material for the tab and stop the rotor to permit plastic deformation of the tab each time an adjustment is to be made. However, that would negate a principle advantage of the invention, which is permitting tab adjustment on a rotating helicopter blade. An additional problem is the necessity of ensuring that each wire bends the tab the same amount so that the tab is not deformed as its deflection is adjusted.

Giurgiutiu, Victor, et al., "Incrementally Adjustable Rotor-Blade Tracking Tab Using SMA Composites," American Institute of Aeronautics and Astronautics, Inc., Proc. 38th Structures, Structural Dynamics and Materials Conference, Kissimmee, Fla., Apr. 7–10, 1997, AIAA Paper No. 97-1387, pages 1456–1466, discloses shape-memory alloy wires embedded in multiple rotor tabs made from an elastic composite material. The tabs are deflected by actuating the wires while the rotor is rotating until tab positions are found that provide the least vibration. In one embodiment the actuator settings that minimized vibration while the rotor was in motion are duplicated after the rotor is stopped. The re-deflected tabs are then hardened by heating into the desired position. Such a system is inconvenient if the tab positions ever need to be readjusted.

The drawbacks of the above approaches apply equally when the goal is to move aerodynamic surfaces besides control tabs for helicopter and tiltrotor blades. An aerodynamic surface capable of moving between discrete positions is disclosed in Duffy, Robert E., et al., "A Theoretical and Experimental Study of the Snap-Through Airfoil and Its Potential as a Higher Harmonic Control Device," American Institute of Aeronautics and Astronautics, Inc., Proc. 26th Aerospace Sciences Meeting, Reno, Nev., Jan. 11–14, 1988, AIAA Paper No. 88-0668, pages 1–11. A large portion of the underside of a wing section is hollowed out and then covered with a skin that "snaps" in and out to change the camber of the wing. The skin is moved using a mechanical linkage and hydraulic actuator in the hollowed out portion of the wing section. It is immediately apparent that such an approach cannot be used to provide a movable tab on a rotor blade, and that the use of hydraulic actuation is cumbersome and heavy.

Of course, so-called "snap-through" actuators per se are known. Yang, Yao-Joe, et al., "Dynamics of a Bistable Snapping Microactuator," Proc. SPIE Smart Structures and Materials Conference, San Diego, Calif., February 1995, Vol. 2443, pages 754–762, discloses a silicon bistable snapping actuator with dimensions of 200 µm×50 µm. Obviously, such an actuator is unsuitable for moving an aerodynamic or hydrodynamic surface, that is, a surface on which act forces generated by moving the surface through a fluid.

SUMMARY OF THE INVENTION

It is an object of the present invention to provide an actuating device for moving an aerodynamic or hydrodynamic surface that overcomes the above disadvantages of the prior art.

In accordance with one aspect of the invention, an actuating device for moving an aerodynamic or hydrodynamic surface subject to fluid forces resulting from relative movement of the surface and a fluid, comprises an active portion confined in an elastically deformed condition and movable between one stable position in which the active portion is elastically deformed to exert an actuating force for holding the surface in one position against a fluid force thereon and at least one other different stable position in which the active portion is elastically deformed to exert an actuating force for holding the surface in a different position against a fluid force thereon.

One of the more specific embodiments of that aspect of the invention is a movable tab made of an elastic material and comprising a flat base portion for mounting the tab on the trailing edge of a rotor blade of a helicopter or tiltrotor, a flat flexure member integral with the base portion and attached thereto at an end of the flexure member, wherein the flexure member terminates at an opposite end thereof in an integral trailing portion, and two straps integral with the base portion and attached thereto at the end of the flexure member at two sides thereof, the straps being secured to the trailing portion proximate to the opposite end of the flexure member to confine the flexure member in an elastically bowed configuration, wherein the tab has a first stable position in which the flexure member is elastically bowed in a first direction and a second stable position in which the flexure member is elastically bowed in a second direction.

Another of the more specific embodiments of the above aspect of the invention is a movable tab made of elastic material and comprising a flat body member, and a pair of flat tongues for mounting the tab on the trailing edge of a rotor blade of a helicopter or tiltrotor, the tongues being integral with the body member and attached thereto at an end of the tongues opposite to where they are mounted to the rotor blade, wherein the tongues are mounted to the rotor blade so that they are elastically deformed substantially in the plane thereof to elastically buckle the body member out of the plane thereof, wherein the tab has a first stable position in which the body member is elastically buckled in a first direction and a second stable position in which the body member is elastically buckled in a second direction.

In those specific embodiments, the tabs may be a non-metallic material.

In addition, the tabs may include at least one shape-memory alloy actuating wire attached to each flat side of the flexure member or body member, wherein one actuating wire is elongated when the member is in one of its stable positions so that heating the wire contracts it and moves the member to its other stable position and elongates the other actuating wire.

In accordance with another aspect of the invention an actuating device comprises an active portion confined in an elastically deformed condition and movable between one stable position in which the active portion is elastically deformed to exert an actuating force and at least one other different stable position in which the active portion is elastically deformed to exert a different actuating force, and at least two shape-memory alloy actuating wires attached to the active portion, wherein one actuating wire is elongated when the active portion is in one of its stable positions so that heating the wire contracts it and moves the active portion to another of its stable positions and elongates the other actuating wire.

BRIEF DESCRIPTION OF THE DRAWINGS

The objects of the invention will be better understood from the detailed description of its preferred embodiments which follows below, when taken in conjunction with the accompanying drawings, in which like numerals refer to like features throughout. The following is a brief identification of the drawing figures used in the accompanying detailed description.

FIGS. 5A and 5B illustrate in detail one of the tabs shown in FIG. 4 in a configuration according to a second embodiment of the present invention, wherein FIG. 5A is a plan view of a blank used to construct the finished tab shown in perspective in FIG. 5B.

FIGS. 6A and 6B illustrate in detail one of the tabs shown in FIG. 4 in a configuration according to another embodiment of the present invention, wherein FIG. 6A is a plan view of a blank used to construct the finished tab shown in perspective in FIG. 6B.

DETAILED DESCRIPTION OF THE PREFERRED EMBODIMENTS

Figure 1:
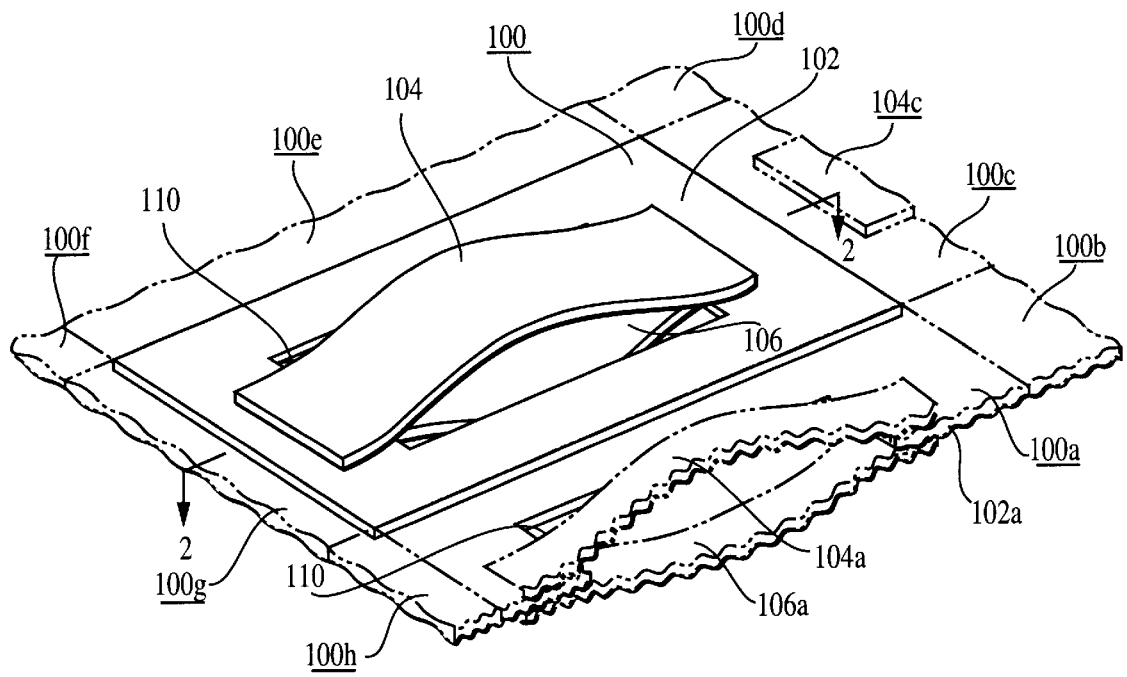
FIG. 1 is a schematic perspective view of an actuating device according to a first embodiment of the present invention.
Figure 2:
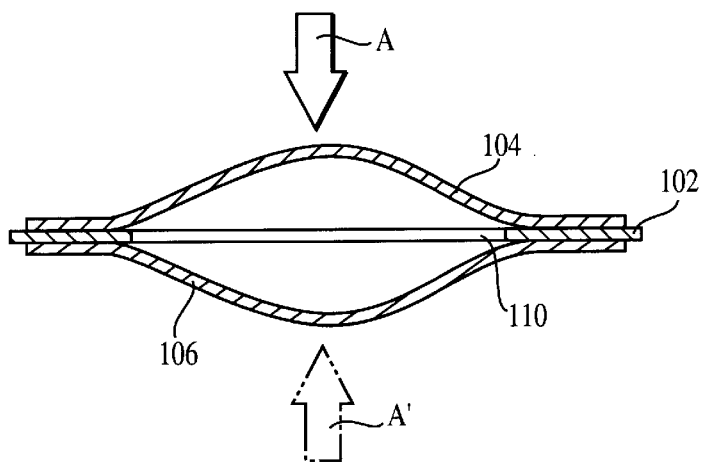
FIG. 2 is a cross-sectional view taken along line 2—2 in FIG. 1, showing the actuating device in one of its three stable positions.
Figure 3:
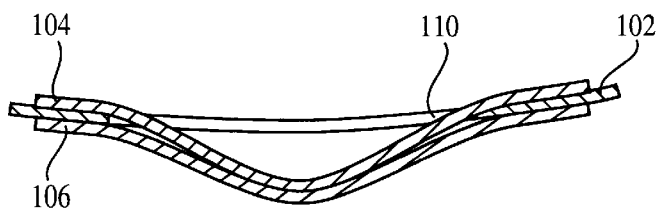
FIG. 3 is a cross-sectional view in the same plane as FIG. 2 showing the actuating device in another of its three stable positions.

Referring to FIGS. 1 to 3, an actuating device 100 according to a first embodiment of the invention has three stable positions. The actuating device 100 of this embodiment includes a substantially planar body member 102, to which are attached the ends of a first flexure member 104 and a second flexure member 106. The flexure members together comprise an active portion of the actuating device of this embodiment.

The body member 102 is made of a flexible material that can be elastically deformed in bending about an axis in the plane of the member. The flexure members 104 and 106 are most conveniently identical and are attached together at their ends by adhering them to opposite surfaces of the body member 102. The body member thus acts as a connecting portion that holds the flexure members in their elastically bowed condition. The manner of attaching the flexure members to the body member depends in some degree to the materials from which the components of the actuating device are made. For example, if they are metal they may be welded together or adhered using a suitable adhesive, or a combination of both. If they are made of a composite material for stealth considerations they may be secured together by an adhesive.

In any event, the ends of the flexure members are attached together so that the flexure members are bowed as depicted in FIG. 1. The body member 102 has a central cut-out 110 through which the flexure members 104 and 106 can pass to move the actuating device 100 into various of its multiple stable positions.

Operation of the actuating device 100 is depicted in FIGS. 2 and 3. FIG. 2 is a cross-section taken along lines 2—2 in FIG. 1, and shows the actuating device in a first stable position. In this position the elastically bowed flexure members 104 and 106 exert equal and opposite bending moments on the body member 102, thus holding the body member in a neutral position as shown in FIGS. 1 and 2.

To move the actuating member to one actuated position the first flexure member 104 can be pushed through the cutout 110 by exerting a force on it that causes it to move in the direction of the arrow A. This actuated position is shown in FIG. 3, which depicts the first flexure member 104 after it has passed through the cutout 110. Because the flexure member 104 is elastically deformed in the position shown in FIG. 3, it and the other flexure member 106 exert a bending moment at their connected ends that causes the body member 102, or any other flexible surface (such as an aerodynamic or hydrodynamic surface) attached to the connected ends of the flexure members, to move under the influence of an actuating force resulting from that bending moment. The flexure member 104 remains elastically deformed as it moves between the positions shown in FIGS. 2 and 3. As a result, it will only occupy another stable position upon reaching the position shown in FIG. 3.

By the same token, the actuating device can be moved to a different stable position from the neutral position shown in FIG. 2 by exerting a force on the second flexure member 106 that causes it to move in the direction of the arrow A'. (This actuated position would be shown in FIG. 3 if it were turned upside down.)

It will be appreciated that the material properties of the flexure members are chosen so that they exert predetermined forces when flexed into position in the device. That is, they will exert a force resisting movement in the direction of the arrows A and A', which force will depend on the material properties of the flexure members. However, as long as the flexure members remain elastically deformed to some degree as they move between their various positions, they will maintain the actuating device in the stable position it occupies until a force is exerted to move it into another position. This is what is meant by references herein to "multiple stable positions." Moreover, because each flexure member remains elastically deformed during movement between positions, any intermediate position of the member is inherently unstable. Accordingly, as a flexure member is moved in the direction of an arrow A or A', it will resist such movement until its deformation reaches a particular stage, at which time it will exert a force on itself tending to "snap" it through the opening 110 into another stable position, where it will remain unless moved therefrom.

The actuating device of the present invention is not limited to the configuration shown in FIGS. 1 to 3. For example, the corresponding ends of the flexure members 104 and 106 could be attached directly to each other and held in the bowed relationship shown in the figures by straps extending between the opposite ends of the flexure members at their outer edges (along the lines of the embodiment shown in FIG. 5 discussed later). In addition, the active portion of the actuating device need not comprise flexure members deformed in bending as shown in this particular embodiment. In a suitable configuration an active portion could be deformed torsionally or otherwise in order to establish the multiple stable positions that are a salient feature of an actuating device according to the invention. Those skilled in the art will doubtlessly conceive of numerous other modifications within the scope of the invention.

The actuating device of the present invention is extremely versatile in that it is not limited to occupying any particular number of stable positions. For example, additional stable positions in the embodiment depicted in FIGS. 1 to 3 can be provided by using multiple flexure members in layers on the top and bottom of the body member. That is, one or more additional flexure members, each slightly longer than the previous one, could be attached at their ends to the ends of the flexure member 104, and similar additional flexure members could be attached at their ends to the ends of the flexure member 106. These additional flexure members making up the active portion of the device will provide additional stable positions depending on how many of the flexure members on either the top or the bottom of the body member are snapped through the opening 110. The actuating device of the present invention is also very versatile in the manner in which it can be used to move an aerodynamic or hydrodynamic surface. For the embodiment discussed in connection with FIGS. 1 to 3, the configuration of a two-dimensional aerodynamic or hydrodynamic surface can be tailored by connecting the surface to a two-dimensional array of actuating devices 100a, 100b, 100c, 100d, 100e, 100f, 100g, 100h, . . . , as shown in phantom lines in FIG. 1 (from which the aerodynamic or hydrodynamic surface is omitted for clarity). The present invention is also adapted for actuation using control inputs (as will be discussed later), so that computer actuation to provide desired aerodynamic or hydrodynamic effects can be achieved using the present invention.

The term "aerodynamic or hydrodynamic surface" as used herein refers to a surface subject to forces resulting from relative movement of the surface and a fluid with which it is in contact. The active portion of the actuating device of the invention exerts an actuating force resisting a fluid force on the surface and thereby holds the surface in a position that corresponds to any of the discrete, stable positions of the active portion. In the embodiment shown in FIGS. 1 to 3, the actuating device moves a separate aerodynamic or hydrodynamic surface suitably attached to the ends of the flexure members. However, it is within the scope of the invention for part of the actuating device to constitute an aerodynamic or hydrodynamic surface.

Figure 4:
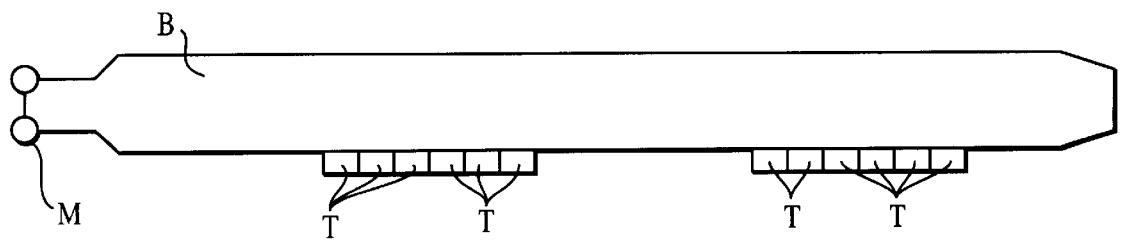
FIG. 4 is a schematic diagram of a helicopter rotor incorporating plural tabs in accordance with an aspect of the present invention.

In that connection, another particular application of the invention is to control vibration in helicopter or tiltrotor blades. Referring to FIG. 4, a helicopter rotor blade B includes at its root end conventional mounting structure M with which the blade is mounted to the helicopter hub (not shown). The mounting structure M permits the pilot through the controls of the helicopter to vary the pitch of the blade to control the flight of the helicopter in a conventional manner. There are multiple such blades B secured to the helicopter shaft, as is also well known.

In accordance with the present invention the blade B has several independently adjustable tabs T attached at its trailing edge. The tabs T extend along the trailing edge of the blade, there usually being about 12 tabs in all, with six toward the root of the blade and six toward the tip. The number of tabs T and the distance for which they extend along the blade can be determined using known principles depending on the amount of control of the blade lift that is desired.

Figure 5A:
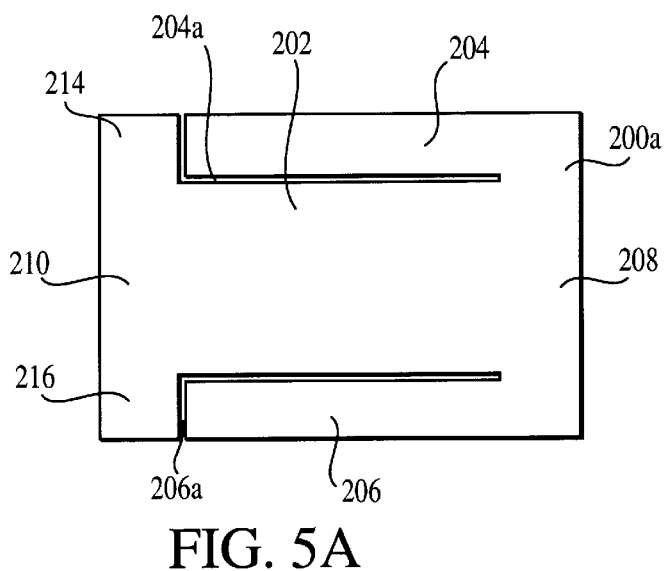
Figure 5B:
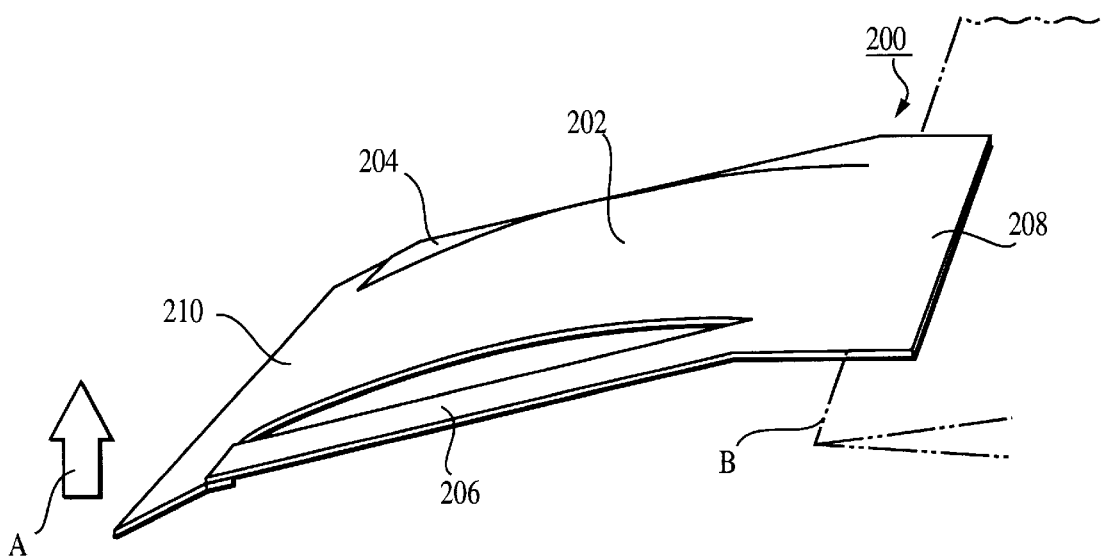

FIGS. 5A and 5B illustrate a first embodiment of a tab according to the present invention. FIG. 5A is a plan view of a blank from which is constructed the finished tab 200 shown in FIG. 5B. The blank 100a is made of any suitable elastic material. If stealth considerations are not important, the stamping 100a may be made of a suitable metal such as aluminum. However, it is an important advantage of this embodiment of the present invention that the tab can be made of a non-metallic material as long as it deforms elastically in a manner consistent with the principles discussed above in connection with FIGS. 1 to 3. Making the tab from a nonmetallic material permits the present invention to adjust the camber of the rotor blade while maintaining its stealth characteristics. If the blank 100a is sheet metal it may be stamped in the desired shape. If it is a nonmetallic composite material it can be molded, stamped, machined, or made in any other manner, depending on the properties of the material used.

The blank 200a includes an active flexure portion 202 and two straps 204 and 206 formed by cuts 204a and 206a in the blank. The cuts define a base portion 208 at the portion of the blank where they remain attached to the body portion 202. The end of the tab opposite the base portion 208 ends in a T-shaped cutout 210. The tab 200 is formed by securing the free ends of the straps 204 and 206 to the respective facing cross portions 214 and 216 of the T-shaped cutout 210, as seen in FIG. 5B. The ends of the straps can be secured to the cross portions in any suitable manner. If the blank is metallic, these pieces may be welded together. However, if the blank is nonmetallic a suitable adhesive will be used to fabricate the tab. As seen in FIG. 5B, the flexure portion 202 is bowed and held in place by the straps 206 and 204, to form a tab with two stable positions, in accordance with the principles discussed above in connection with FIGS. 1 to 3.

The base portion 208 of the resulting tab 200 is attached to the trailing edge of the blade B as shown in FIG. 5B. The tab is typically secured to the blade by a suitable adhesive. A plurality of the tabs 200 are placed along the blade's trailing edge as shown in FIG. 4. In the configuration shown in FIG. 5B, the flexure portion 202 is bowed upwardly, and the resulting bending moment forces downward the T-shaped cutout 210, which forms the trailing edge of the tab 200, into a first stable position. The result is an increase in the lift of the blade at the location where the tab is secured. If the tab's trailing edge is forced upward in the direction of the arrow A, the flexure portion 202 snaps into its other stable position in which it is flexed downward, forcing the trailing edge of the tab upward. In this position the tab reduces the lift produced by the blade at the location where the tab is secured.

In operation, the tab positions that reduce 1/rev vibrations to the greatest extent can be determined in a variety of ways. For example, accelerometers in the helicopter (or other rotorcraft) can be used to detect vibrations for analysis by a computer program. The computer is programmed in accordance with the model of the aircraft to indicate to ground personnel what tab positions will minimize 1/rev vibration. This can be an iterative process by which the computer can calculate additional tab settings to further minimize vibrations each time the tab positions are reset.

Figure 6A:
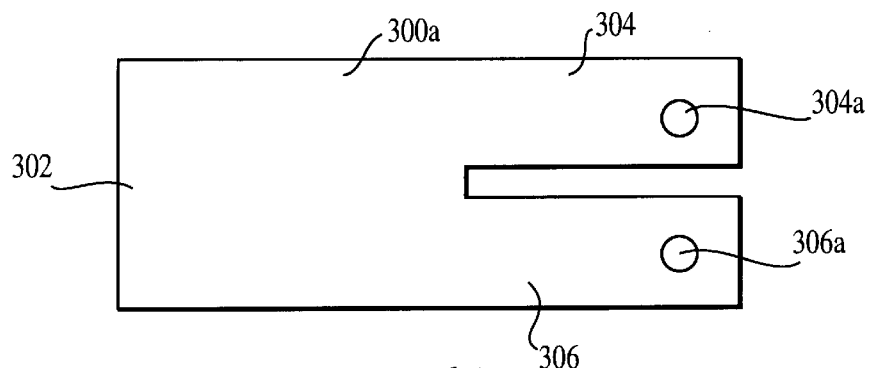
Figure 6B:
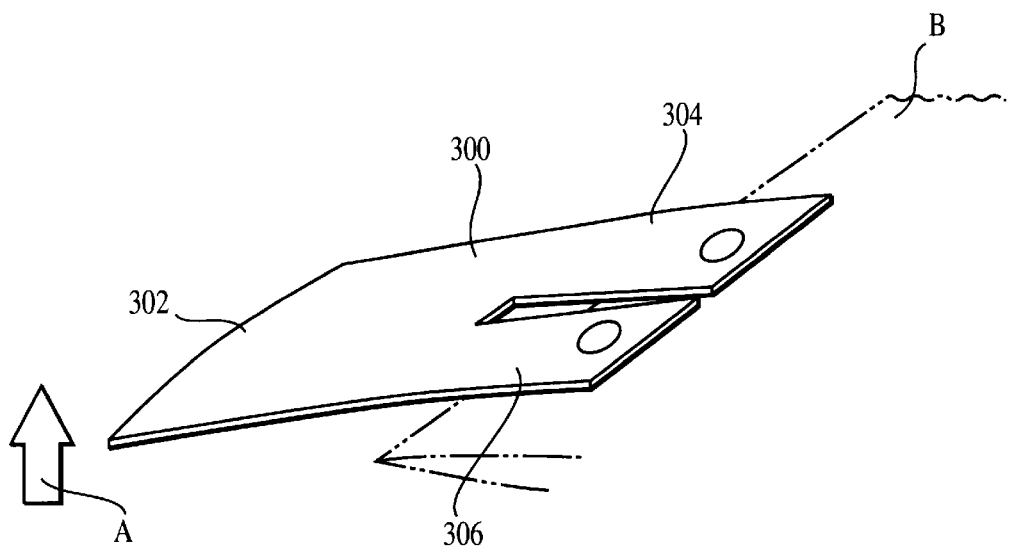

FIGS. 6A and 6B illustrate a second embodiment of a tab according to the present invention. FIG. 6A is a plan view of a blank from which is constructed the finished tab 300 shown in FIG. 6B. As with blank 200, the blank 300a is made of any suitable elastic material. It is made in the same fashion as the blank 200a.

The blank 300a includes a body portion 302 and two tongues 304 and 306 extending from the base portion. The tongues 304 and 306 have through holes 304a and 306a. The tab 300 is formed by deforming the tongues substantially in the plane they occupy and fastening them to the trailing edge of the blade B with fasteners (not shown) through the holes 304a and 304b as shown in FIG. 6B.

It will be appreciated that when the tongues 304 and 306 are deformed in the above manner, the body portion 302 buckles slightly out of its plane, as shown by the convex (as viewed in FIG. 6B) curved trailing edge of the body portion. This creates from the tongues and the body portion an active portion that operates in accordance with the principles discussed above. This results in a bending moment that forces the body portion downward so that the tab occupies a first stable position. The result is an increase in the lift of the blade at the location where the tab is secured. If the tab's trailing edge is forced upward in the direction of the arrow A, the body portion and the tongues snap into their other stable position in which the trailing edge of the body portion is concavely curved and the tab occupies a second stable position. The blade's aerodynamic properties are therefore adjusted using the tabs 300 in the same manner discussed above in connection with the tabs 200.

Manually actuated devices like the tabs 200 and 300 have the advantage of great simplicity of manufacture and operation. They have a virtually unlimited life and are very reliable. With a material having sufficient stiffness, they will not move from the position in which they are placed under the most severe aerodynamic loading. Moreover, they can be made from non-metallic, stealthy materials, thus making available the advantages of the metallic tabs long used on conventional helicopter rotor blades in reducing or eliminating 1/rev vibrations. However, those tabs suffer from the disadvantage that the rotor must be stopped to move the tab into one or the other of its stable positions. In that respect, they are less advantageous than the shape-memory alloy actuated tab in my U.S. Pat. No. 5,752,672.

Figure 7:
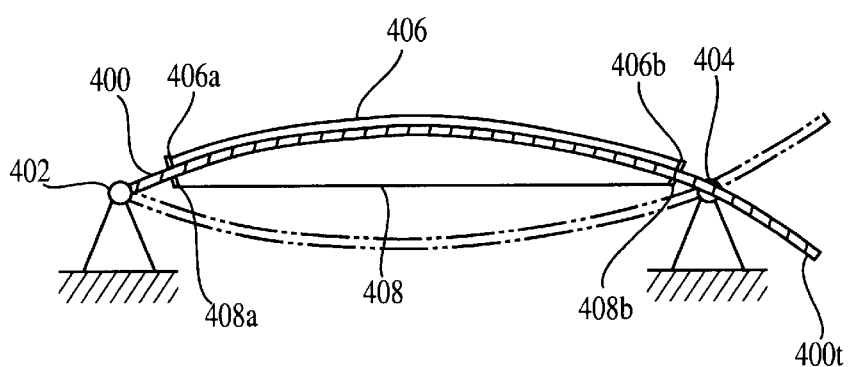
FIG. 7 schematically illustrates the principles of operation underlying another aspect of the present invention wherein an active portion of an actuating device is operated with a shape-memory alloy actuator.

Accordingly, another embodiment of the present invention provides a remotely operable actuating device. The principles underlying this aspect of the invention are illustrated in FIG. 7. A flexure member 400 is attached at two fixed pivot points 402 and 404. It will be appreciated that this arrangement models a bistable actuating device in which an active portion comprises a single flexure member secured in a bowed configuration (see FIG. 5B, for example). In this aspect of the invention a first actuating member 406 is attached to two spaced-apart raised points 406a and 406b on the top of the flexure member 400. A second actuating member 408 is attached to two spaced-apart raised points 408a and 408b on the bottom of the flexure member 400. (Terms such as "vertical," "up," "bottom," and the like are used throughout this description to assist in describing embodiments of the invention; their use should not be taken to limit the invention to being used in any particular orientation.) The mounting points are raised from the surface to increase the bending moment applied to the flexure member when the wire contracts, and thus increase the force tending to move the flexure member from its stable position.

The actuating members 406 and 408 are preferably wires of a shape-memory alloy. If this type of material is deformed at a lower temperature (typically room temperature in the material's martensitic phase), it will recover some of that deformation when heated to a higher temperature (into the material's austenitic phase). A common shape-memory alloy is a nickel-titanium alloy (55% Ni—45% Ti), and the heating necessary to recover the deformation can be accomplished by passing an electric current through it.

It will be appreciated that the flexure member 400 has two stable positions, as discussed in detail in connection with the previous embodiments of the gigs invention. The first is shown in FIG. 7, in which the flexure member forms an arc above the two pivot points 402 and 404. The flexure member can also occupy a second stable position in which it forms an arc (shown as a phantom line in FIG. 7) below the two pivot points. In this respect it acts in a fashion similar to the flexure members discussed above.

This geometry also enables the actuating device to provide a large amount of deflection for only a relatively small amount of strain of the shape-memory alloy actuating wires 406 and 408. The number of cycles of operation of a typical shape-memory alloy depends on the amount of elongation introduced in the alloy. For example, if the initial deformation of each of the wires 406 and 408 is limited to about 3%, their expected lifetime is on the order of $10^6$ cycles of operation.

In the model shown in FIG. 7, if the wire 408 is in its contracted, actuated position and the elongated wire 408 has an induced strain of 3%, the effective camber of the base member is 12%. That is, the vertical deflection of the flexure member above the horizontal divided by the distance between the pivot points is 0.12. If the flexure member were considered to be an uncambered airfoil, that would be an effective pitch change of 13.7°. If it is assumed that the shape of the deflected flexure member is sinusoidal, the portion 400t of the flexure member 400 extending beyond the pivot 404 is inclined at about 7° to the horizontal. Therefore, the present invention provides positive and negative camber values of 12%, or an equivalent peak-to-peak swing in pitch for an uncambered airfoil section of about 27°, while the trailing edge portion 400t will have a 14° peak-to-peak throw.

It will be appreciated that the present invention utilizes the essential dual-state property of a shape-memory alloy. That is, the present invention requires the shape-memory alloy wires only to occupy one of two positions, thus avoiding the complications inherent in using shape-memory alloy actuators for so-called "proportional control" as described in Hodgson, "Using Shape Memory for Proportional Control," *Engineering Aspects of Shape Memory Alloys* (Ed. Duerig et al.), Butterworth-Heinemann (London), 1990, pages 362–366, and other prior art systems already discussed above.

To assemble an actuating device like that modeled in FIG. 7 the flexure member 400 is moved to one of its two stable positions. Assuming that it is placed in the position shown in FIG. 7, it will be understood that the dimensions of the device are chosen so that the upper shape-memory alloy wire 406, which is in its elongated state, is strained no more that 3% beyond the straight-line distance between its attachment points on the flexure member. The actuating wire 406 is then heated to cause it to contract so that the flexure member snaps through to the position shown in phantom in FIG. 7. The bottom actuating wire 408, having first been subjected to a 3% strain, is then secured to the flexure member at the attachment points therefor. When the flexure member moves from one position to the other by actuating the wire that is elongated, it deforms the unelongated, unactuated wire. Heating that unactuated wire will place the flexure member back into the first position.

An actuating device according to this aspect of the invention has various applications.

Figure 8:
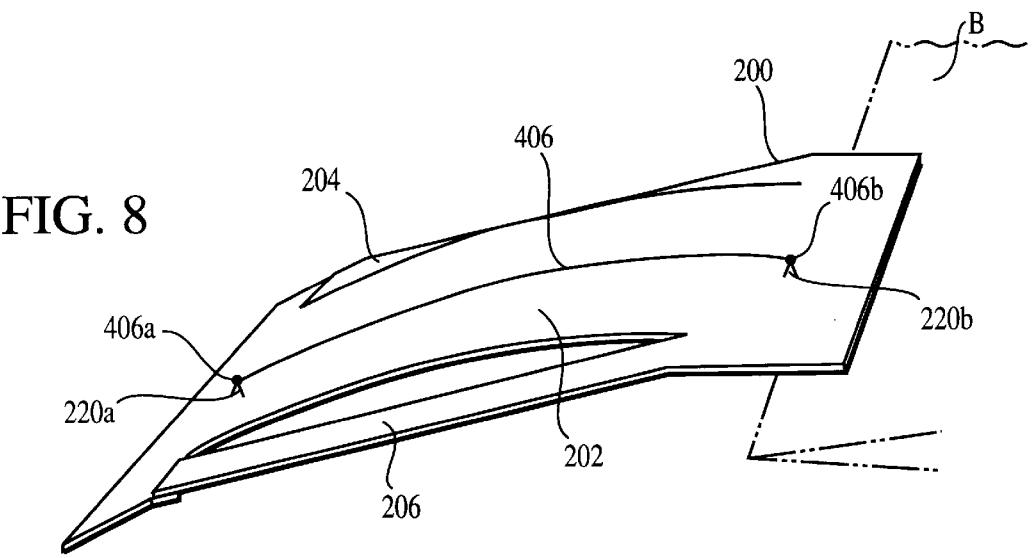
FIG. 8 illustrates the use of a tab such as that shown in FIG. 5B as a remotely-actuatable bistable tab.

FIG. 8 illustrates how such an actuating device can be applied to the tab 200 so that it is capable of remote actuation in accordance with the principles discussed in my U.S. Pat. No. 5,752,672. In this application an upper shape-memory alloy actuating wire 406 extends over the flexure portion 202 and is attached at the raised points 406a and 406b. If the blank 200a is molded, the attachment points can be provided by incorporating small raised bosses 220a and 220b into the blank when it is molded. The bosses raise the wire attachment points a sufficient amount to exert the desired bending moment on the flexure portion 202, given the amount that the flexure portion is deformed when in the stable position shown in FIG. 8 and its material properties. A bottom actuating wire (not shown) is similarly attached to raised mounting points on the other side of the flexure portion 202. Accordingly, when one or the other wire is heated, it contracts to its undeformed length and moves the tab 200 to one or the other of its two stable positions.

Figure 9:
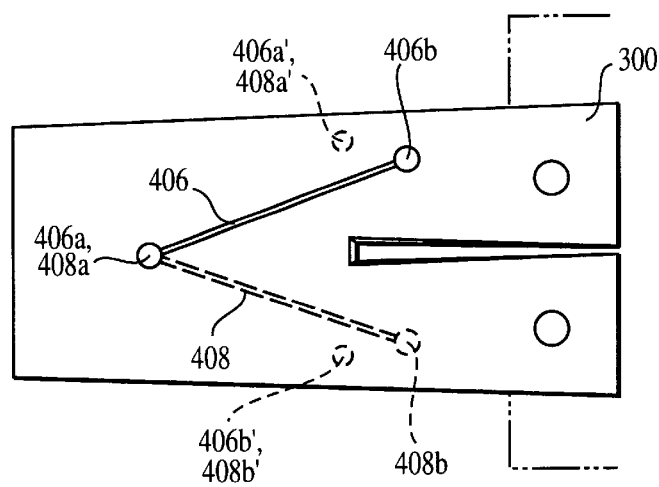
FIG. 9 illustrates the use of a tab such as that shown in FIG. 6B as a remotely-actuatable bistable tab.

FIG. 9 illustrates how such an actuating device can similarly be applied to the tab 300. In this application an upper shape-memory alloy actuating wire 406 extends between upper-surface raised attachment points 406a and 406b, while a lower shape-memory alloy actuating wire 408 extends between lower-surface raised attachment points 408a and 408b. When the tab 300 is in the position shown in FIG. 6B, the upper wire 406 is elongated and the lower wire 408 is contracted, due to the slightly convex curvature of the tab. Actuating the upper wire 406 causes the tab to move to its concave stable position. In an alternate embodiment the upper actuating wire can be attached to upper mounting points 406a', 406b' and the lower actuating wire can be attached to lower mounting points 408a', 408b' directly beneath the upper mounting points. (The wires, which therefore extend across the tab at the location of the base of the slot formed by the tongues, are not depicted in this alternate embodiment for the sake of clarity.)

Both of the embodiments in FIGS. 8 and 9 have an additional advantage in that one end of all of the wires can be connected to ground (in FIG. 9, it would be the ends attached to the points 406a, 408a). Thus, it would be necessary to provide a control input to only one end of each wire to actuate the device.

Using shape-memory alloy actuating wires in the present invention has numerous advantages. It consumes even less electrical power than the arrangement in my U.S. Pat. No.

245,752,672, since the actuating wires need not be energized throughout the entire range of motion of the device. Like the system in that patent, it can be used while the helicopter is in flight, thus providing control in any flight condition or regime. It can be retrofitted easily to existing aircraft because its low weight and small size will not affect flight characteristics. Because any number of tabs can be used on a particular control surface, it may be possible in certain conditions to control spanwise load variations on rotor blades during flight, which is impossible with manual systems. Since there are only two possible tab positions, any tab sensing arrangement can be greatly simplified if not eliminated altogether.

Other actuating materials, such as piezoelectric or magnetostrictive materials, can be used as well as shape-memory alloy wires to provide the necessary actuation force. However, shape-memory alloys provide large strain and force capability without the attendant bulk required of other "smart" materials to enhance their mechanical advantage. The use of a two-position device enables the use of very simple control logic (such as "change state" logic), which eliminates the requirement for an internal control loop associated with each actuator. For example, movement of the tab could close and open a switch, or the tab could have a piezoelectric element adhered to its surface so that it provided a voltage upon deflection of the tab, or a control chip on the tab could be used to direct current to the proper wire and sense the position of the tab, just to name a few possibilities.

In addition, hysteresis in the shape-memory alloy response does not affect the device, since the amount by which the shape-memory alloy contracts, which is the operative parameter for the device, remains unaffected by such hysteresis. It may be possible to use the present invention to completely eliminate the need for mechanical rotor blade control using swash plates, lag dampers, torque tubes and other hub hardware. If non-metallic tabs are used, the stealth characteristics of the aircraft can be less compromised while still permitting in-flight tab adjustment.

The present invention also contemplates using tabs with more than two stable positions, and actuating same in accordance with the principles discussed in connection with FIG. 7. For example, an actuating device like that discussed above in connection with FIGS. 1 to 3 can be used with a helicopter or tiltrotor blade. Shape-memory alloy wires, or other actuators, could be used to selectively actuate each flexure member in such a device. In addition, any tab configuration can be implemented using multiple tabs connected to each other. For example, a first tab like the tab 200 is attached to the blade as shown in FIG. 5B, and the base portion of a second tab could be connected to the trailing edge of the first tab. Selective actuation of the tabs in such a multiple tab arrangement would provide even more control over the aerodynamic properties of the blade.

The actuating devices shown above can also be used in a lifting surface for full camber or trailing edge camber adjustment, not just to change the position of a trailing edge tab.

Figure 10:
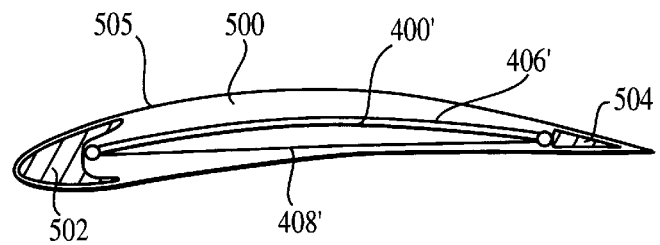
FIG. 10 illustrates the use of an actuating device with multiple stable positions according to the present invention used to move a lifting member to control the camber thereof.

FIG. 10 is a cross-sectional view of a control surface 500 with a rigid leading edge spar 502 and a rigid trailing edge spar 504 connected by a flexible skin 505. A flexure member 400' is connected between the spars, which act as pivot points like points 402 and 404 in FIG. 7. Shape-memory alloy actuating wires 406' and 408' are attached to the base member as discussed above. In this manner, alternately energizing the wires 406' and 408' change the camber of the control surface.

Figure 11:
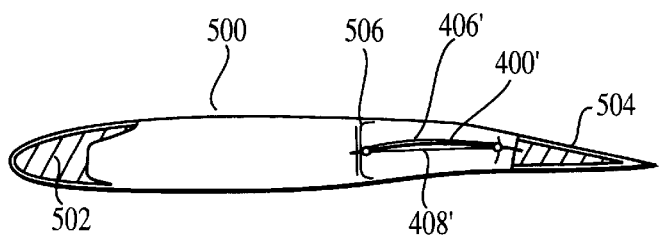
FIG. 11 illustrates the use of an actuating device with multiple stable positions according to the present invention used to move the trailing edge portion of a lifting member to control the camber thereof.

In an alternate embodiment, shown in FIG. 11, an intermediate spar 506 provides the forward pivot point for the flexure member 400'. In this arrangement only camber of the portion of the control surface proximate to the trailing edge changes upon energization of the actuating wires. As before, these applications of the invention are not limited to use with an actuating device having only two stable positions.

It will be appreciated that an actuating device as disclosed herein may be extended to applications beyond helicopter and other rotary wing aircraft. As noted above, such a device may be incorporated as part of any aerodynamic or hydrodynamic surface. Its multiple stable positions make it adaptable for use as a spoiler, an alternative to conventional flaps, in electronic trim systems for elevators and rudders, in deployable vortex generators, and as an actuator for control surfaces for mitigating vibration and buffeting due to unfavorable interactional aerodynamics at certain flight conditions, just to name a few. Indeed, the actuating device of the present invention in its remotely operable configuration actuating device can be used to move any object, whether it be a tab on a rotating helicopter or tiltrotor blade, a solar panel or other structure on an orbiting spacecraft, or any other inaccessible object.

While preferred embodiments of the invention have been depicted and described, it will be understood that various changes and modifications can be made other than those specifically mentioned above without departing from the spirit and scope of the invention, which is defined solely by the claims that follow.

What is claimed is:

1. An actuating device for moving an aerodynamic surface subject to fluid forces resulting from relative movement of the surface and a fluid, the actuating device comprising:

an active portion including at least one flexure member confined in an elastically deformed condition and being movable between one stable position in which said active portion is elastically deformed to exert an actuating force for holding the surface in one position against a fluid force thereon and another different stable position in which said active portion is elastically deformed to exert an actuating force for holding the surface in a different position against a fluid force thereon; and at least one shape-memory alloy actuating wire attached to each of two opposing sides of said flexure member, wherein one said actuating wire is elongated when said flexure member is in one of its stable positions so that heating said wire contracts it and moves said flexure member to its other stable position and elongates the other said actuating wire.

2. An actuating device for moving an aerodynamic surface subject to fluid forces resulting from relative movement of the surface and a fluid, the actuating device comprising an active portion including at least one flexure member confined in an elastically deformed condition and being movable between one stable position in which said active portion is elastically deformed to exert an actuating force for holding the surface in one position against a fluid force thereon and another different stable position in which said active portion is elastically deformed to exert an actuating force for holding the surface in a different position against a fluid force thereon, wherein said actuating device includes a flat body member and a pair of tongues attached to said body member and extending therefrom for attachment to the aerodynamic surface, and wherein the actuating device forms a tab for changing the aerodynamic characteristics of the surface, said tongues being elastically deformed substantially in the plane thereof to elastically buckle said body member out of the plane thereof, wherein said body member and said tongues form said active portion.

3. An actuating device as in claim 2, further comprising at least one shape-memory alloy actuating wire attached to each flat side of said body member, wherein one said actuating wire is elongated when said flexure member is in one of its stable positions so that heating said wire contracts it and moves said flexure member to its other stable position and elongates the other said actuating wire.

4. An actuating device comprising:
   an active portion confined in an elastically deformed condition and movable between one stable position in which said active portion is elastically deformed to exert an actuating force and at least one other different stable position in which said active portion is elastically deformed to exert a different actuating force; and
   at least two shape-memory alloy actuating wires attached to said active portion, wherein one said actuating wire is elongated when said active portion is in one of its stable positions so that heating said wire contracts it and moves said active portion to another of its stable positions and elongates the other said actuating wire.

5. An actuating device as in claim 4, wherein said active portion includes at least one flat flexure member confined in an elastically bowed configuration by a connecting portion and has at least two stable positions.

6. A movable tab made of an elastic material, the tab comprising:
   a flat base portion for mounting the tab on the trailing edge of a rotor blade of one of a helicopter and tiltrotor;
   a flat flexure member integral with said base portion and attached thereto at an end of said flexure member, wherein said flexure member terminates at an opposite end thereof in an integral trailing portion; and
   two straps integral with said base portion and attached thereto at said end of said flexure member at two sides thereof, said straps being secured to said trailing portion proximate to said opposite end of said flexure member to confine said flexure member in an elastically bowed configuration, wherein the tab has a first stable position in which said flexure member is elastically bowed in a first direction and a second stable position in which said flexure member is elastically bowed in a second direction.

7. A tab as in claim 6, wherein said elastic material is a non-metallic material.

8. A tab as in claim 6, further comprising at least one shape-memory alloy actuating wire attached to each flat side of said flexure member, wherein one said actuating wire is elongated when said flexure member is in one of its stable positions so that heating said wire contracts it and moves said flexure member to its other stable position and elongates the other said actuating wire.

9. A rotor blade having a plurality of tabs as in claim 6 attached to the trailing edge thereof.

10. A movable tab made of elastic material, the tab comprising:
    a flat body member; and
    a pair of flat tongues for mounting the tab on the trailing edge of a rotor blade of one of a helicopter and tiltrotor, said tongues being integral with said body member and attached thereto at an end of said tongues opposite to where they are mounted to the rotor blade, wherein said tongues are mounted to the rotor blade so that they are elastically deformed substantially in the plane thereof to elastically buckle said body member out of the plane thereof, wherein the tab has a first stable position in which said body member is elastically buckled in a first direction and a second stable position in which said body member is elastically buckled in a second direction.

11. A tab as in claim 10, wherein said elastic material is a non-metallic material.

12. A tab as in claim 10, further comprising at least one shape-memory alloy actuating wire attached to each flat side of said body member, wherein one said actuating wire is elongated when said body member is in one of its stable positions so that heating said wire contracts it and moves said body member to its other stable position and elongates the other said actuating wire.

13. A rotor blade having a plurality of tabs as in claim 10 attached to the trailing edge thereof.

14. An actuating device for moving a hydrodynamic surface subject to fluid forces resulting from relative movement of the surface and a fluid, the actuating device comprising:
    an active portion including at least one flexure member confined in an elastically deformed condition and being movable between one stable position in which said active portion is elastically deformed to exert an actuating force for holding the surface in one position against a fluid force thereon and another different stable position in which said active portion is elastically deformed to exert an actuating force for holding the surface in a different position against a fluid force thereon; and
    at least one shape-memory alloy actuating wire attached to each of two opposing sides of said flexure member, wherein one said actuating wire is elongated when said flexure member is in one of its stable positions so that heating said wire contracts it and moves said active portion to its other stable position and elongates the other said actuating wire.

15. An actuating device for moving a hydrodynamic surface subject to fluid forces resulting from relative movement of the surface and a fluid, the actuating device comprising an active portion including at least one flexure member confined in an elastically deformed condition and being movable between one stable position in which said active portion is elastically deformed to exert an actuating force for holding the surface in one position against a fluid force thereon and another different stable position in which said active portion is elastically deformed to exert an actuating force for holding the surface in a different position against a fluid force thereon, wherein said actuating device includes a flat body member and a pair of tongues attached to said body member and extending therefrom for attachment to the hydrodynamic surface, and wherein the actuating device forms a tab for changing the hydrodynamic characteristics of the surface, said tongues being elastically deformed substantially in the plane thereof to elastically buckle said body member out of the plane thereof, wherein said body member and said tongues form said active portion.

16. An actuating device as in claim 15, further comprising at least one shape-memory alloy actuating wire attached to each flat side of said body member, wherein one said actuating wire is elongated when said flexure member is in one of its stable positions so that heating said wire contracts it and moves said flexure member to its other stable position and elongates the other said actuating wire.

* * * * *